United States Patent
Ye et al.

(10) Patent No.: US 10,070,145 B2
(45) Date of Patent: Sep. 4, 2018

(54) METHOD OF CODING BASED ON STRING MATCHING FOR VIDEO COMPRESSION

(71) Applicant: MediaTek Singapore Pte. Ltd., Singapore (SG)

(72) Inventors: Jing Ye, San Jose, CA (US); Shan Liu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 678 days.

(21) Appl. No.: 14/613,418

(22) Filed: Feb. 4, 2015

(65) Prior Publication Data

US 2015/0229971 A1 Aug. 13, 2015

Related U.S. Application Data

(60) Provisional application No. 61/937,081, filed on Feb. 7, 2014.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/593* | (2014.01) |
| *H04N 19/129* | (2014.01) |

(52) U.S. Cl.
CPC ......... *H04N 19/593* (2014.11); *H04N 19/129* (2014.11)

(58) Field of Classification Search
CPC ........................... H04N 19/129; H04N 19/593
See application file for complete search history.

(56) References Cited

U.S. PATENT DOCUMENTS

| | | | | |
|---|---|---|---|---|
| 6,320,522 | B1 * | 11/2001 | Satoh .................. | H03M 7/3084 341/51 |
| 2003/0002184 | A1 * | 1/2003 | Hayami ................ | H03M 5/145 360/29 |
| 2009/0046815 | A1 * | 2/2009 | Oh ......................... | H04H 20/30 375/340 |

OTHER PUBLICATIONS

Lin et al. AHG8: P2M based dual-coder extension of HEVC. Joint Collaborative Team on Video Coding (JCT-VC). Geneva. (Jan. 2013).*

* cited by examiner

*Primary Examiner* — Tat Chi Chio
*Assistant Examiner* — Fabio S Lima
(74) *Attorney, Agent, or Firm* — Oblon, McClelland, Maier & Neustadt, L.L.P.

(57) ABSTRACT

A method of dictionary coding using coding unit (CU) based processing or using string length coding by taking into account of color component aligned matched sample-strings are disclosed. In the dictionary coding using CU based processing, the pixels in each CU is converted to one-dimensional (1-D) pixel data according to an intra-block scanning pattern. A string search is then performed to determine a match condition regarding whether a current sample-string starting at a current position of the current 1-D packed pixel data matches a previously coded sample-string in the reference 1-D packed pixel data. For string length coding by taking into account of color component aligned matched sample-strings, a flag is signaled to indicate whether the string length of one previously coded sample-string is in a length group corresponding to color-component-aligned previously coded sample-strings.

9 Claims, 4 Drawing Sheets

METHOD OF CODING BASED ON STRING MATCHING FOR VIDEO COMPRESSION

CROSS REFERENCE TO RELATED APPLICATIONS

The present invention claims priority to U.S. Provisional Patent Application Ser. No. 61/937,081, filed on Feb. 7, 2014. The U.S. Provisional Patent Application is hereby incorporated by reference in its entirety.

FIELD OF THE INVENTION

The present invention relates to video coding for screen contents. In particular, the present invention relates to coding matching string in dictionary based coding for screen contents.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

Dictionary coding has been found to be very effective for screen contents. A dual coder that selectively use a dictionary coder or a traditional hybrid coder has been disclosed in JCTVC-K0133 by Lin et al., (*AHG7: Full-chroma (YUV444) dictionary+hybrid dual-coder extension of HEVC*, Joint Collaborative Team on Video Coding (JCT-VC) of ITU-T SG 16 WP 3 and ISO/IEC JTC 1/SC 29/WG 11, 11th Meeting: Shanghai, CN, 10-19 Oct. 2012, Document: JCTVC-K0133). The above reference is referred as JCTVC-K0133 in this disclosure. For a dictionary coder, the two-dimensional (2-D) image data is converted into a one-dimensional (1-D) packed pixel data. The processing is applied to each largest coding unit (LCU), which is also termed as a coding tree unit (CTU). The scanning pattern used by JCTVC-K0133 is shown in FIG. 1, where a vertical scan is applied to pixels within each LCU. The scanning starts from the upper-left corner of the LCU and goes downward to the bottom of the vertical line. After the first line is converted, the scanning process moves to the top of the second line and the process continues through the last line of the LCU. The scanning is applied across LCUs horizontally from a left most LCU to the last LCU in a LCU row.

An example of dictionary coding process is illustrated in FIG. 2, where the LCU consists of 16×16 pixels in a packed pixel format according to the scanning pattern shown in FIG. 1. In the packed pixel format, the color components at each pixel are treated individual samples. For example, in the case of YUV444 color format, the packed pixel format corresponds to color samples ($Y_0$, $U_0$, $V_0$, $Y_1$, $U_1$, $V_1$, . . . , where $Y_n$, $U_n$, $V_n$ are the three color components of a pixel). Similarly, for RGB444 color format, the packed pixel format corresponds to color samples ($R_0$, $G_0$, $B_0$, $R_1$, $G_1$, $B_1$, . . . , where $R_n$, $G_n$, $B_n$ are the three color components of a pixel).

FIG. 2 illustrates an example of encoding LCU m using dictionary coding, where the underlying video data uses a 444 color format (e.g., YUV444 or RGB444). The searching window (i.e., previously coded pixels) is treated as a long 1-D string generated according to the exemplary scanning pattern in FIG. 1. For the current LCU, vertical scanning is employed to convert the color pixels in the LCU into a 1-D sample string. The packed pixels corresponding to previously coded blocks (i.e., LCU in this example) are referred as reference packed pixels in this disclosure. Starting from the first sample (i.e., the upper-left corner sample) of LCU m, the encoder searches the optimal (e.g., longest) string in the searching window that matches the sample string in LCU m. The string found in the searching window is called matching string and the sample string in LCU m is called matched string. FIG. 2 shows the first three matching (and matched) strings for LCU m:

1) The $1^{st}$ matching (and matched) string shown in fill pattern 211 has 42 samples (i.e., 14 pixels) and the matching string is located in LCU 0 (i.e., the last 15 samples of the last column) and LCU 1 (i.e., the first 27 samples of the first column).
2) The $2^{nd}$ matching (and matched) string shown in fill pattern 212 has 33 samples (i.e., 11 pixels) and the matching string is located inside LCU 0 (i.e., the last 21 samples of the third column followed by the first 12 samples of the fourth column);
3) The $3^{rd}$ matching (and matched) string shown in fill pattern 213 has 45 samples (15 pixels) and the matching string is located in LCU h−1 (i.e., the last 39 samples of the last column) and LCU h (i.e., the first 6 samples of the first column).

Dictionary based dual-coder bitstream according to JCTVC-K0133 is a mix of dictionary coder bitstream segment and traditional hybrid coder bitstream segment. A corresponding decoder will parse the coder type in the CTU layer to determine whether a current CTU is coded by the dictionary coder or the hybrid coder. A syntax element ctu_coded_by_dictionary_coder_flag is used to indicate whether the CTU is coded by dictionary coder or not. The exemplary CTU layer syntax according to JCTVC-K0133 is shown in Table 1.

TABLE 1

|  | Descriptor |
|---|---|
| coding_tree_unit( x0, y0, log2CbSize ) { | |
|     xCtb = ( CtbAddrRS % PicWidthInCtbsY ) << Log2CtbSizeY | |
|     yCtb = ( CtbAddrRS / PicHeightInCtbsY ) << Log2CtbSizeY | |
|     CtbAddrInSliceSeg = CtbAddrInRS − | |
|     slice_segment_address | |
|     if( slice_sao_luma_flag \|\| slice_sao_chroma_flag ) | |
|         sao( xCtb >> Log2CtbSizeY, yCtb >> Log2CtbSizeY ) | |
|     if(dual_coder_mode = = 0) | |
|         coding_quadtree( xCtb, yCtb, Log2CtbSizeY, 0 ) | |
|     else { | |
|         ctu_coded_by_dictionary_coder_flag | ae(v) |
|         if(cu_coded_by_dictionary_coder_flag = = 0) | |
|         //HYBRID_CODER | |
|             coding_quadtree( xCtb, yCtb, Log2CtbSizeY, 0 ) | |
|         else | |
|             dictionary_coder( x0, y0, Log2CtbSizeY ) | |
|     } | |
| } | |

In Table 1, ctu_coded_by_dictionary_coder_flag equal to 0 specifies that the CTU is coded by the hybrid coder. ctu_coded_by_dictionary_coder_flag equal to 1 specifies that the CTU is coded by the dictionary coder.

The dictionary_coder( ) syntax according to JCTVC-K0133 is shown in Table 2. NumSamplesInCTU is the total number of Y samples, U samples, and V samples in a coding unit. For example, the total number of samples is 16×16×3=768 for a coding tree unit of size 16×16 pixels in a 444 color format, and 64×64×3=12,288 for a coding tree unit of size 64×64 pixels in 444 color format).

TABLE 2

|  | Descriptor |
|---|---|
| dictionary_coder( x0, y0, Log2CtbSizeY ) { | |
|   decoded_sample_count = 0 | |
|   NumSamplesInCTU = (3 << (Log2CtbSizeY << 1)) | |
|   while(decoded_sample_count < NumSamplesInCTU) { | |
|   matching_string_flag | ae(v) |
|   if(matching_string_flag = = 1) { | |
|     matching_string_distance_use_recent_8_flag | ae(v) |
|     if(matching_string_distance_use_recent_8_flag = = 1) { | |
|       matching_string_distance_recent_8_idx | ae(v) |
|       matching_string_distance_minus1 = | |
|         for( i = | |
|         matching_string_distance_recent_8_idx; | |
|         i > 0; i−− ) | |
|           Recent8Distances[i] = Recent8Distances[i−1] | |
|       Recent8Distances[0] = | |
|       matching_string_distance_minus1 | |
|     } | |
|     else { | |
|       matching_string_distance_minus1 | ae(v) |
|         for( i = 7; i > 0; i−− ) | |
|           Recent8Distances[i] = Recent8Distances[i−1] | |
|       Recent8Distances[0] = | |
|       matching_string_distance_minus1 | |
|     } | |
|     matching_string_length_minus2 | ae(v) |
|     decoded_sample_count += | |
|     (matching_string_length_minus2 + 2) | |
|   } | |
|   else { | |
|     unmatchable_sample_residual_abs | ae(v) |
|     unmatchable_sample_residual_sign | ae(v) |
|     decoded_sample_count += 1 | |
|     } | |
|   } | |
| } | |

In Table 2, matching_string_flag specifies whether the succeeding dictionary coding element is a matching string or an unmatchable sample residual, where the sample may correspond to a luma or chroma sample. If matching_string_flag=1, the succeeding dictionary coding element is a matching string, otherwise, the succeeding dictionary coding element is an unmatchable sample residual.

matching_string_distance_use_recent_8_flag equal to 1 specifies that the current matching_string_distance_minus1 is exactly the same as one of the eight most recently decoded matching_string_distance_minus1 stored in an eight-entry array named Recent8Distances[8] and the succeeding syntax element is an index of the array.

matching_string_distance_use_recent_8_flag equal to 0 specifies that the succeeding syntax element is matching_string_distance_minus1.

matching_string_distance_recent_8_idx is an index to Recent8Distances[8].

matching_string_distance_minus1+1 specifies the distances between the first sample of current sample-string to be decoded/constructed and the first sample of matching sample-string previously decoded/constructed in the dictionary, which is actually DPB (decoded picture buffer) and the current decoded picture reordered in a "dictionary-scan" format defined as a column-wise-packed-pixel cu-by-cu format. The value of matching_string_distance_minus1 shall be in the range of 0 to 4,194,303, inclusive matching_string_length_minus2+2 specifies the length of the matching sample-string. The value of matching_string_length_minus2 shall be in the range of 0 to 271, inclusive.

unmatchable_sample_residual_abs is the absolute difference between the unmatchable sample (e.g., Y, U or V component of a YUV pixel) to be decoded and its predictor that is the same component (y or u or v) of the previous pixel in the dictionary. The value of unmatchable_sample_residual_abs shall be in the range of 0 to (256<<bit_depth_luma_minus8)−1 for luma component or (256<<bit_depth_chroma_minus8)−1 for chroma component, inclusive.

unmatchable_sample_residual_sign specifies the sign of an unmatchable sample residual. If unmatchable_sample_residual_sign is equal to 0, the corresponding unmatchable sample residual has a positive value. Otherwise (unmatchable_sample_residual_sign is equal to 1), the corresponding unmatchable sample residual has a negative value.

Exemplary corresponding decoding pseudo codes for the dictionary based coding are described as follows. 3 bits are used for matching_string_length_minus2 in the ranges of [0, 7] and [8, 16], and 8 bits for else are used for the remaining lengths.

```
Decode Smaller_than_8_flag
if ( Smaller_than_8_flag== 1 )
      decode 3 bits matching_string_length_minus2
   else
   {
      Decode Smaller_than_16_flag
      If ( Smaller_than_16_flag==1 )
      {
         decode 3 bits matching_string_length_minus2
      matching_string_length_minus2=
      matching_string_length_minus2+8;
      }
      else
      {
         decode 8 bits matching_string_length_minus2;
      matching_string_length_minus2=
      matching_string_length_minus2+16
```

```
        }
    }
    length = matching_string_length_minus2+ MATCH_LEN_MIN;
    uDecByteCnt += length.
```

The sample based string formation and the LCU based scanning may not be coding efficient. It is desirable to develop new dictionary coding to improve the coding performance of existing dictionary coding.

BRIEF SUMMARY OF THE INVENTION

A method of dictionary coding using coding unit (CU) based scan or color component aligned string matching are disclosed. In the dictionary coding using CU based scanning, the pixels in each CU is converted to one-dimensional (1-D) pixel data according to an intra-block scanning pattern. The pixels of previously coded CUs are converted to reference 1-D packed pixel data using the intra-block scanning pattern for each of the previously coded CUs. A string search is then performed to determine a match condition regarding whether a current sample-string starting at a current position of the current 1-D packed pixel data matches a previously coded sample-string in the reference 1-D packed pixel data. If the match condition is asserted, one or more first syntax elements are signaled to indicate a string length of the current sample-string. If the match condition is not asserted for the current sample-string, one or more second syntax elements are signaled to encode one or more current samples starting at the current position of the current 1-D packed pixel data.

In the dictionary coding using color-component-aligned string matching, the pixels in each block is converted to one-dimensional (1-D) pixel data according to an intra-block scanning pattern. The pixels of previously coded blocks are converted to reference 1-D pixel data using the intra-block scanning pattern for each of the previously coded blocks. A string search is then performed to determine match conditions regarding whether a current sample-string starting at a current position of the current 1-D pixel data matches a previously coded sample-string in the reference 1-D pixel data and the current sample-string is color-component-aligned with the previously coded sample-string. If the match conditions are asserted, one or more first syntax elements are signaled to indicate a string length of the current sample-string. If the match conditions are not asserted for the current sample-string, one or more second syntax elements are signaled to encode one or more current samples starting at the current position of the current 1-D pixel data.

The intra-block scanning pattern may correspond to a vertical scanning pattern starting from an upper-left corner of a given block and scanning from top to bottom in each vertical line. The previously coded coding units can be scanned from left to right in each coding unit row to generate the reference 1-D packed pixel data.

The one or more first syntax elements may comprise a first flag indicating whether the string length of the current sample-string is in a first length group. If the first flag is asserted, said one or more first syntax elements further comprise a first length indicator to indicate the string length of the current sample-string, and if the first flag is not asserted, the one or more first syntax elements may further comprise a second flag indicating whether the string length of the current sample-string is in a second length group. If the second flag is asserted, the one or more first syntax elements may further comprise a second length indicator to indicate the string length of the current sample-string, and if the second flag is not asserted, the one or more first syntax elements may further comprise a third length indicator to indicate the string length of the current sample-string. The first length indicator, the second length indicator and the third length indicator may correspond to N1 (e.g., 3) bits, N2 (e.g., 3) bits and N3 (e.g., 8) bits respectively.

When the video data uses YUV444 or RGB444 format, the string length for the color-component-aligned string matching is restricted to be a multiple of 3. For example, the first length group consists of first lengths in multiples of 3 from K1 (e.g., 3) to L1 (e.g., 24), and the second length group consists of second lengths in multiples of 3 from K2 (e.g., 252) to L2 (e.g., 273).

In one embodiment, both CU-based scanning and color-component-aligned string matching are incorporated.

DETAILED DESCRIPTION OF THE INVENTION

Figure 1:
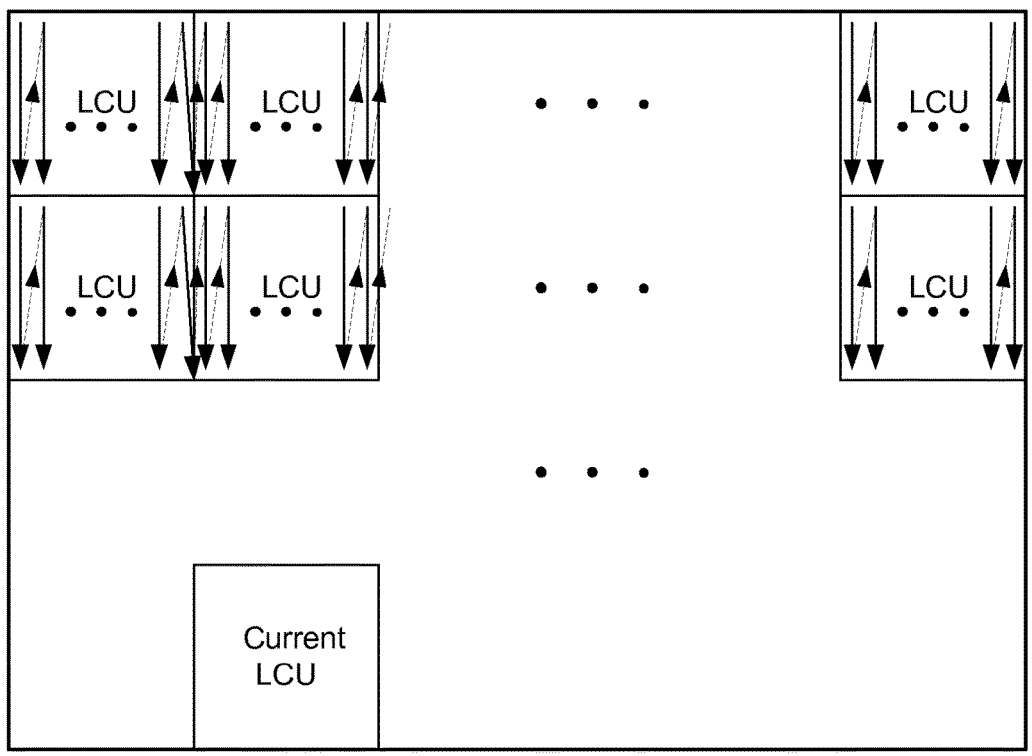
FIG. 1 illustrates an example of LCU (largest coding unit) based intra-block scanning and cross block scanning according to JCTVC-K0133.
Figure 2:
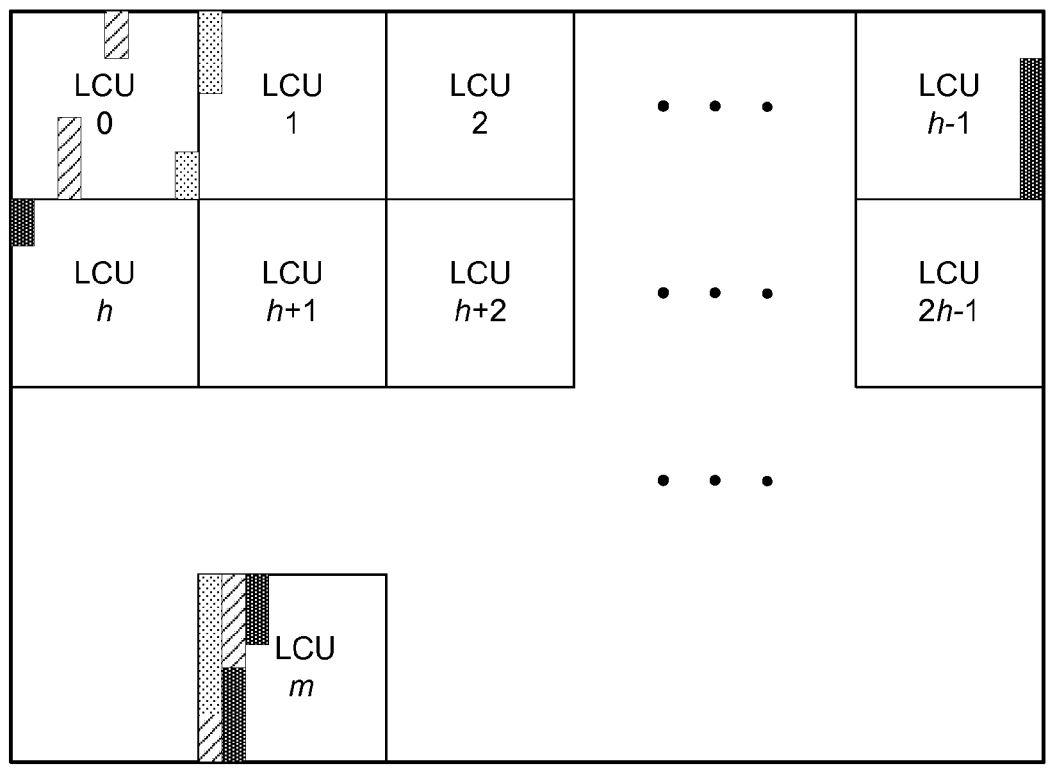
FIG. 2 illustrates an example of LCU (largest coding unit) based string matching according to JCTVC-K0133.

The following description is of the best-contemplated mode of carrying out the invention. This description is made for the purpose of illustrating the general principles of the invention and should not be taken in a limiting sense. The scope of the invention is best determined by reference to the appended claims.

In the dictionary coding according to JCTVC-K0133, the color samples associated with pixels in a largest coding unit (LCU) or coding tree unit (CTU) are converted into packed pixel data using a scanning pattern. String matching is performed by matching a current sample-string with one previously coded sample-string, where each sample is treated independently regardless the corresponding color component. Therefore, the match process may match a current first sample (e.g., $Y_n$) of YUV444 video data with a sample (e.g., $U_m$) in the reference 1-D packed pixel data. Such cross-component matching occurs much less likely in typical screen contents. Accordingly, one embodiment of the present invention takes into consideration of the higher probabilities of matched sample-strings having corresponding color components aligned. In the case of 444 color format (e.g., YUV444), a current sample-string starting with ($Y_n$, $U_n$, $V_n$) is more likely color-component-aligned matched with a previously coded sample-string starting with ($Y_m$, $U_m$, $V_m$). Accordingly, embodiments according to the present invent use shorter codewords for color-component-aligned matched sample-strings. When a 444 color format, such as YUV444 or RGB444 is used, the string length of a color-component-aligned sample-string will be a multiple of 3.

Embodiment 1

In this embodiment, a first group consisting of more probably string lengths may be selected to use shorter codewords (i.e., the index to identify the selected string length in the first group) with length N1. The first group corresponds to string lengths in a first range [K1, L1]. Similarly, a second group consisting of second more probably string lengths may be selected to use shorter codewords (i.e., the index to identify the selected string length in the second group) with length N2, where N2≥N1. The second group corresponds to string lengths in a second range [K2, L2]. Parameters K1, L1, N1, K2, L2 and N2 are all positive integers. If third group is used, the codewords (i.e., the index to identify the selected string length in the third group) may use N3 bits, where N3≥N2≥N1. An exemplary coding scheme similar to that of JCTVC-K0133 is used as an illustration, where the string lengths are divided into three groups. Each of the first two groups consists of 8 string lengths. As mentioned before, the first two groups contain string lengths corresponding to [0, 7] and [8, 15] for JCTVC-K-0133. However, according to this embodiment, the first two groups of string lengths only contain string lengths corresponding to multiples of 3. In particular, the first group and second group contain string lengths of multiples of 3 in the range [3, 24] and [27, 48] respectively. Furthermore, 8 bits are used for the remaining string lengths. An exemplary pseudo code for embodiment 1 is shown as follows.

```
Decode Smaller_than_27_And_divided_by3_flag
if ( Smaller_than_27_And_divided_by3_flag==1 )
{
    decode 3 bits length;
```

-continued

```
        Length=length*3+3;
    }
    else
    {
        Decode Smaller_than_51_And_divided_by3_flag
        If ( Smaller_than_51_And_divided_by3_flag== 1 )
        {
            decode 3 bits length;
            Length=length*3+27;
        }
        else
        {
            decode 8 bits length;
        }
    }
    uDecByteCnt += length;
```

The present invention takes into consideration of statistics of string lengths, where color-component-aligned sample-strings occur more likely than non-color-component-aligned sample-strings. Accordingly, shorter codewords are used for the color-component-aligned sample-strings than the non-color-component-aligned sample-strings. While three string length groups are used as an example, it may use more or less length groups to practice the present invention. Furthermore, it is not necessary to divide the matched sample-strings into different length groups according to the present invention. In other words, all matched sample-strings may be in the same length group and the color-component-aligned sample-strings are assigned shorted codewords than the non-color-component-aligned sample-strings. Furthermore, while specific codeword lengths (e.g., 3, 3 and 8 bits for three respective groups) and specific ranges (e.g., [3, 24] and [27, 48]) are provided for illustration throughout this disclosure, the present invention is not restricted to specific numerical values.

Embodiment 2

According to this embodiment, the first two groups of string lengths only contain string lengths corresponding to multiples of 3. In particular, the first group and second group contain string lengths of multiples of 3 in the range [27, 48] and [51, 72] respectively. Again, 8 bits are used for the remaining string lengths. An exemplary pseudo code for embodiment 2 is shown as follows.

```
Decode bigger_than_24_And_smaller_than_51_And_divided_by3_flag
if ( bigger_than_24_And_smaller_than_51_And_divided_by3_flag==1 )
{
    decode 3 bits length;
    Length=length*3+27;
}
else
{
Decode bigger_than_48_And_smaller_than_75_and_divided_by3_flag
    If ( bigger_than_48_And_smaller_than_75_and_divided_by3_flag==1 )
    {
        decode 3 bits length;
        Length=length*3+51;
    }
    else
    {
        decode 8 bits length;
    }
}
uDecByteCnt += length;
```

Embodiment 3

According to this embodiment, the first two groups of string lengths only contain string lengths corresponding to multiples of 3. In particular, the first group and second group contain string lengths of multiples of 3 in the range [3, 24] and [252, 273] respectively. Again, 8 bits are used for the remaining string lengths. An exemplary pseudo code for embodiment 3 is shown as follows.

```
Decode Smaller_than_27_And_divided_by3_flag
if ( Smaller_than_27_And_divided_by3_flag==1 )
{
    decode 3 bits length;
    Length=length*3+3;
}
else
{
```

-continued

```
Decode bigger_than_251_And_divided_by3_flag
If (bigger_than_251_And_divided_by3_flag== 1 )
    {
        decode 3 bits length;
        Length=length*3+252;
    }
    else
    {
        decode 8 bits length;
    }
}
uDecByteCnt += length;
```

Embodiment 4

According to this embodiment, the first two groups of string lengths only contain string lengths corresponding to multiples of 3. In particular, the first group and second group contain string lengths of multiples of 3 in the range [27, 48] and [252, 273] respectively. Again, 8 bits are used for the remaining string lengths. An exemplary pseudo code for embodiment 4 is shown as follows.

```
Decode bigger_than_24_And_Smaller_than_51_And_divided_by3_flag
if ( bigger_than_24_And_Smaller_than_51_And_divided_by3_flag== 1 )
    {
      decode 3 bits length;
      Length=length*3+27;
    }
    else
    {
            Decode bigger_than_251_And_divided_by3_flag
  If (bigger_than_251_And_divided_by3_flag==1 )
            {
              decode 3 bits length;
            Length=length*3+252;
            }
        else
            {
            decode 8 bits length;
            }
    }
}
uDecByteCnt += length;
```

While four embodiments are shown above, a person skilled in the art may change the parameters to practice the present invention without departing from the spirit of the present invention. In each embodiment above, two different ranges of matching lengths in multiples of 3 are selected and each is coded using 3 bits. There two length groups correspond to the high-probability length groups and shorter codewords (i.e., 3 bits) are used for the members in the groups. The remaining matching lengths are coded using 8 bits. The two selected matching length ranges in multiples of 3 may correspond to {[51, 72], [252, 273]}, {[75, 96], [252, 273]}, {[99, 120], [252, 273]}, {[123, 145], [252, 273]}, {[148, 169], [252, 273]}, {[172, 193], [252, 273]}, {[195, 216], [252, 273]} or {[219, 240], [252, 273]}.

In another embodiment, the dictionary coding is applied to the coding unit (CU) level instead of LCU level of JCTVC-K0133. As is known in HEVC, the CUs are generated from LCU using quadtree partition. The CU based dictionary coding is expected to offer more flexibility compared to the LCU, which is usually much larger in size. When the CU based dictionary coding is used, the intra-block scanning is applied to each CU to convert the 2-D block data into 1-D packed pixel data. The vertical scanning used in JCTVC-K0133 to convert a LCU can also be used here to convert a CU. However, other intra-block scanning may also be used.

An exemplary syntax design for the CU level is shown in Table 3. When a CU is not coded using Intra_BC (i.e., Intra block copy mode) as indicated by note (3-1) of Table 3, whether dictionary coding is enabled is checked (i.e., checking intra_p_enabled_flag) as shown in note (3-2) of Table 3. If dictionary coding is enabled, a syntax element, intra_p_flag[x0][y0] is incorporated as indicated by note (3-3) to signal if dictionary coding is used for the CU. Whether dictionary coding is used is checked as indicated by note (3-4) of Table 3. If it is asserted, dictionary coding is applied to the CU as indicated by note (3-5) of Table 3.

TABLE 3

|  | Descriptor | Note |
|---|---|---|
| coding_unit( x0, y0, log2CbSize ) { | | |
| ... | | |
| else { | | |
|   if( intra_block_copy_enabled_flag ) | | |
|     intra_bc_flag[ x0 ][ y0 ] | ae(v) | |
|   if( !intra_bc_flag[ x0 ][ y0 ] ) { | | (3-1) |
|     if(intra_p_enabled_flag ) | | (3-2) |
|       intra_p_flag[ x0 ][ y0 ] | ae(v) | (3-3) |
|     if(intra_p_flag[ x0 ][ y0 ] ) | | (3-4) |
|       p_coder( x0, y0, log2CbSize ) | | (3-5) |
|   } | | |
|   if( !intra_p_flag [ x0 ][ y0 ] ){ | | |
|     if( slice_type != I && | | |
|       !intra_bc_flag[ x0 ][ y0 ]) | | |
|       pred_mode_flag | ae(v) | |
|     ..... | | |
|   } | | |
| } | | |
| } | | |

The performance of a dictionary-based video coding system incorporating an embodiment of the present invention is compared to the performance of an anchor system corresponding to the conventional system based on JCTVC-K0133 as shown in Table 4. The system incorporating an embodiment of the present invention is applied to each coding unit (CU) instead of the largest CU (LCU) used by JCTVC-K0133. Furthermore, the first two groups of string lengths correspond to the string lengths of multiples of 3 in the range [3, 24] and [252, 273] respectively. A negative value in the BD-rate implies the system corresponding to the present invention has better perform than the anchor system. The performance in terms of BD-rate for the system corresponding to the present invention shows improvement in most cases. In particular, the improvement is very noticeable for screen contents, where the improvement is as high as 5%. The run times in terms of encoding time and decoding time are increased to 182% and 150% respectively.

TABLE 4

|  | All Intra HE Main-tier | | |
| --- | --- | --- | --- |
|  | Y | U | V |
| MC YUV 444 | −0.8% | −0.4% | −0.3% |
| SC RGB 444 | −2.7% | −2.5% | −2.5% |
| Animation RGB 444 | 0.1% | 0.1% | 0.1% |
| SC YUV 444 | −1.2% | −1.1% | −1.6% |
| Animation YUV 444 | 0.1% | 0.3% | 0.1% |
| HuaWei4 YUV 444 | −2.1% | −1.2% | −1.7% |
| SC(444) GBR Optional | −4.1% | −3.8% | −3.8% |
| SC(444) YUV Optional | −4.0% | −5.0% | −4.7% |
| Enc Time[%] | | 182% | |
| Dec Time[%] | | 150% | |

Figure 3:
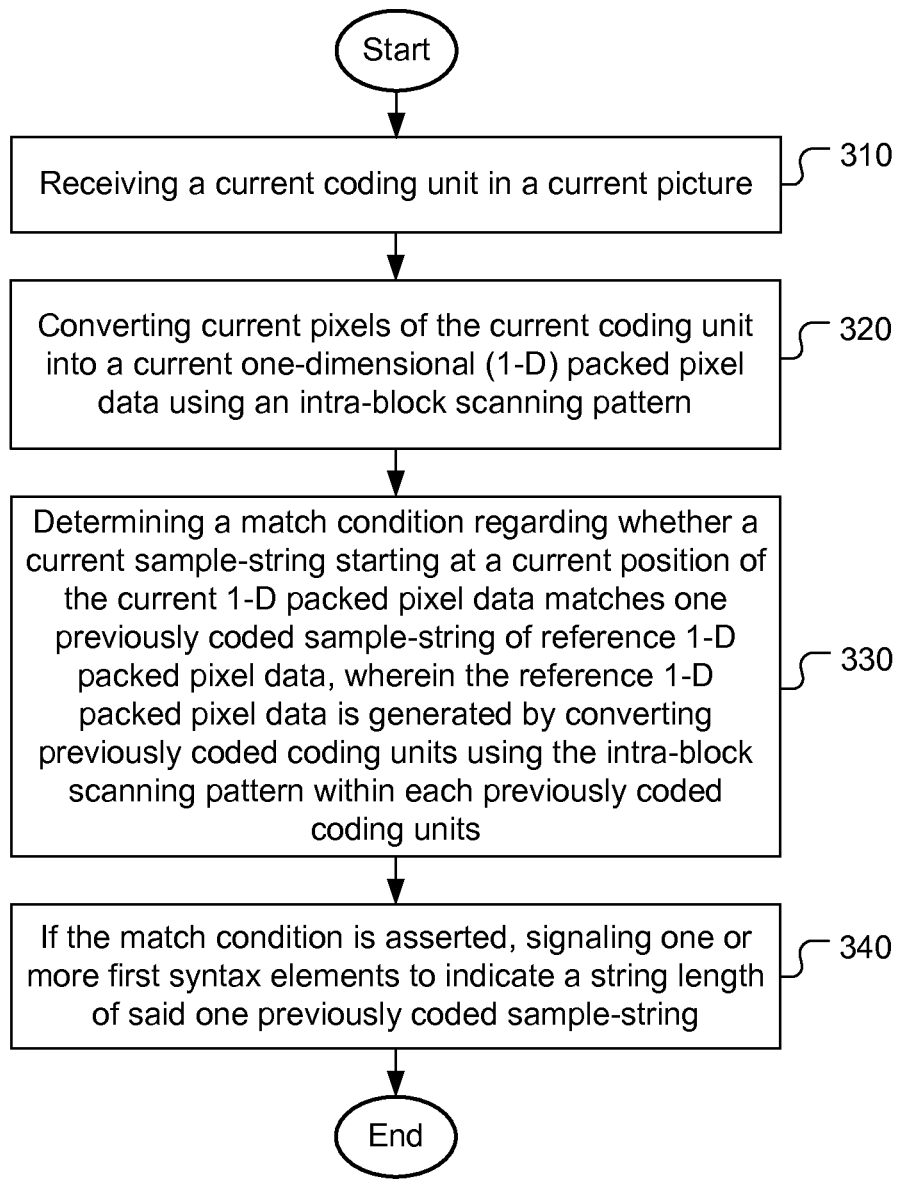
FIG. 3 illustrates a flowchart of an exemplary dictionary encoder incorporating an embodiment of the present invention to use coding unit based dictionary coding, where intra-block scanning is applied to each CU.

FIG. 3 illustrates a flowchart of an exemplary dictionary encoder incorporating an embodiment of the present invention to use coding unit based dictionary coding, where the scanning is applied to each CU. The system receives a current coding unit in a current picture as shown in step 310. The current coding unit may be retrieved from memory (e.g., computer memory, buffer (RAM or DRAM) or other media) or from a processor. Current pixels of the current coding unit are converted into a current one-dimensional (1-D) pixel data (one-dimensional pixel data) using an intra-block scanning pattern as shown in step 320. A match condition is determined regarding whether a current sample-string starting at a current position of the current 1-D packed pixel data matches one previously coded sample-string of reference 1-D packed pixel data. The reference 1-D packed pixel data is generated by converting previously coded coding units using the intra-block scanning pattern within each previously coded coding unit. If the match condition is asserted, one or more first syntax elements are signaled to indicate a string length of said one previously coded sample-string as shown in step 340.

Figure 4:
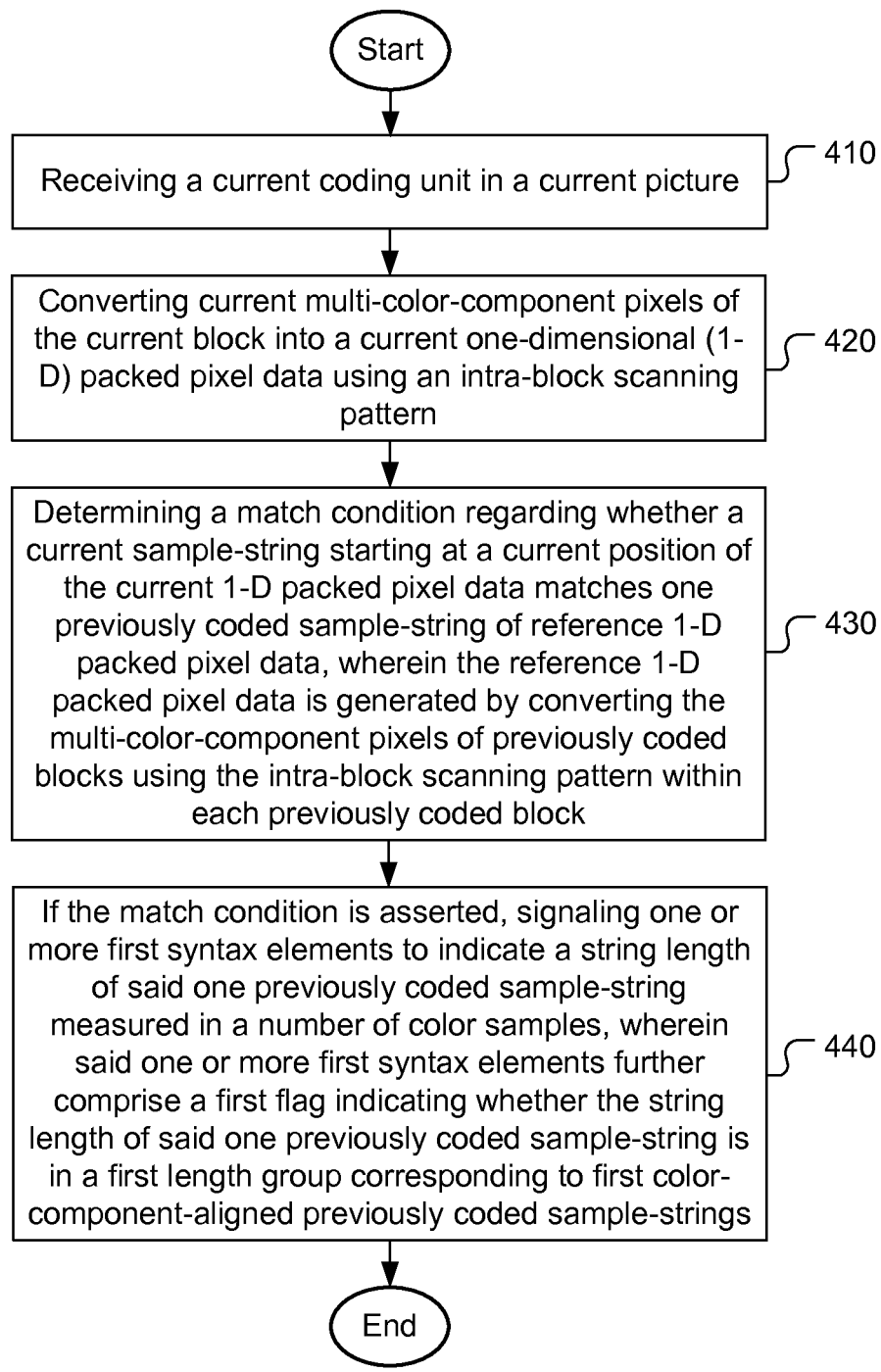
FIG. 4 illustrates a flowchart of an exemplary dictionary encoder incorporating an embodiment of the present invention to use shorted codewords for color-component-aligned previously coded sample-strings.

FIG. 4 illustrates a flowchart of an exemplary dictionary encoder incorporating an embodiment of the present invention to use color-component-aligned string matched. The system receives a current coding unit in a current picture as shown in step 410. Current multi-color-component pixels of the current block are converted into a current one-dimensional (1-D) packed pixel data using an intra-block scanning pattern as shown in step 420. A match condition is determined regarding whether a current sample-string starting at a current position of the current 1-D packed pixel data matches one previously coded sample-string of reference 1-D packed pixel data in step 430. The reference 1-D packed pixel data is generated by converting the multi-color-component pixels of previously coded blocks using the intra-block scanning pattern within each previously coded block. If the match condition is asserted, signaling one or more first syntax elements to indicate a string length of said one previously coded sample-string measured in a number of color samples as shown in step 440. The one or more first syntax elements further comprise a first flag indicating whether the string length of said one previously coded sample-string is in a first length group corresponding to first color-component-aligned previously coded sample-strings.

The flowcharts shown above are intended to illustrate examples of dictionary coding using CU based scanning/string matching or color-component-aligned string length coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of dictionary-based encoding for a block of video data, the method comprising:
  receiving a current coding unit in a current picture, wherein the current coding unit is one of a plurality of coding units that are partitioned from a large coding unit (LCU);
  converting current pixels of the current coding unit into a current one-dimensional (1-D) packed pixel data using an intra-block scanning pattern;

determining a match condition regarding whether a current sample-string starting at a current position of the current 1-D packed pixel data matches one previously coded sample-string of reference 1-D packed pixel data, wherein the reference 1-D packed pixel data is generated by converting previously coded coding units using the intra-block scanning pattern within each previously coded coding unit;

if the match condition is asserted, signaling one or more first syntax elements to indicate a string length of said one previously coded sample-string, wherein said one or more first syntax elements comprise a first flag indicating whether the string length of said one previously coded sample-string is in a first length group, wherein if the first flag is asserted, said one or more first syntax elements further comprise a first length indicator to indicate the string length of said one previously coded sample-string, and if the first flag is not asserted, said one or more first syntax elements further comprise a second flag indicating whether the string length of said one previously coded sample-string is in a second length group, and wherein the first length group and the second length group include only string lengths that are restricted to be multiples of 3;

encoding the current sample-string based on the match condition.

2. The method of claim 1, wherein the intra-block scanning pattern corresponds to a vertical scanning pattern starting from an upper-left corner of a given coding block and scanning from top to bottom in each vertical line.

3. The method of claim 1, wherein the previously coded coding units are scanned from left to right in each coding unit row to generate the reference 1-D packed pixel data.

4. The method of claim 1, wherein if the second flag is asserted, said one or more first syntax elements further comprise a second length indicator to indicate the string length of said one previously coded sample-string, and if the second flag is not asserted, said one or more first syntax elements further comprise a third length indicator to indicate the string length of said one previously coded sample-string.

5. The method of claim 4, wherein the first length indicator, the second length indicator and the third length indicator correspond to N1 bits, N2 bits and N3 bits respectively, wherein N1, N2 and N3 are positive integers.

6. The method of claim 5, wherein the first length indicator, the second length indicator and the third length indicator correspond to 3 bits, 3 bits and 8 bits respectively.

7. The method of claim 1, further comprising, if the match condition is not asserted for the current sample-string, signaling one or more second syntax elements to encode one or more current samples starting at the current position of the current 1-D packed pixel data.

8. The method of claim 1, wherein when the video data uses a YUV color format with 4:4:4 subsampling (YUV444) or a RGB color format with 4:4:4 subsampling (RGB444 format), the string length is restricted to be a multiple of 3.

9. A method of dictionary-based decoding for a block of video data, the method comprising:

receiving a bitstream for video data including a current coding unit in a current picture, wherein the current coding unit is one of a plurality of coding units that are partitioned from a large coding unit (LCU);

parsing one or more first syntax elements indicating a string length of one previously coded sample-string if a current sample-string of a current one-dimensional (1-D) packed pixel data matches said one previously coded sample-string of reference 1-D packed pixel data, wherein the reference 1-D packed pixel data is generated by converting previously coded coding units using an intra-block scanning pattern within each previously coded coding unit;

decoding the current sample-string using information including said one or more first syntax elements and previously coded sample-strings, wherein the previously coded sample-strings are derived from the reference 1-D packed pixel data by converting the previously coded coding units into the reference 1-D packed pixel data using the intra-block scanning pattern within each previously coded coding unit; and after the current 1-D packed pixel data of the current coding unit are all decoded, converting the current 1-D packed pixel data decoded into decoded current pixels of the coding unit using a reverse intra-block scanning pattern, wherein said one or more first syntax elements comprise a first flag indicating whether the string length of said one previously coded sample-string is in a first length group, wherein if the first flag is asserted, said one or more first syntax elements further comprise a first length indicator to indicate the string length of said one previously coded sample-string, and if the first flag is not asserted, said one or more first syntax elements further comprise a second flag indicating whether the string length of said one previously coded sample-string is in a second length group, and wherein the first length group and the second length group include only string lengths that are restricted to be multiples of 3.

* * * * *